(12) United States Patent
Simura et al.

(10) Patent No.: US 11,603,899 B2
(45) Date of Patent: Mar. 14, 2023

(54) ROTARY DAMPER

(71) Applicant: KABUSHIKI KAISHA SOMIC ISHIKAWA, Tokyo (JP)

(72) Inventors: Ryota Simura, Hamamatsu (JP); Masaaki Takii, Hamamatsu (JP)

(73) Assignee: SOMIC MANAGEMENT HOLDINGS INC., Tokyo (JP)

( * ) Notice: Subject to any disclaimer, the term of this patent is extended or adjusted under 35 U.S.C. 154(b) by 114 days.

(21) Appl. No.: 17/174,243

(22) Filed: Feb. 11, 2021

(65) Prior Publication Data

US 2021/0270340 A1 Sep. 2, 2021

(30) Foreign Application Priority Data

Feb. 27, 2020 (JP) .............................. JP2020-032249

(51) Int. Cl.
*F16F 9/14* (2006.01)
*F16F 9/34* (2006.01)

(52) U.S. Cl.
CPC ............... *F16F 9/145* (2013.01); *F16F 9/34* (2013.01); *F16F 2222/12* (2013.01); *F16F 2232/02* (2013.01); *F16F 2236/08* (2013.01)

(58) Field of Classification Search
CPC ...... F16F 9/12; F16F 9/34; F16F 9/145; F16F 2222/12; F16F 2232/02; F16F 2234/00; F16F 2236/08; F16H 7/129; F16H 7/0848; F16H 2007/0859
USPC ........................................................ 188/293
See application file for complete search history.

(56) References Cited

U.S. PATENT DOCUMENTS

| 5,052,982 | A | | 10/1991 | Ouchi | |
| 5,697,122 | A | * | 12/1997 | Okabe | F16F 9/145 188/293 |
| 2003/0126717 | A1 | * | 7/2003 | Iwashita | F16F 9/34 16/82 |
| 2014/0345992 | A1 | * | 11/2014 | Hu | F16F 9/145 188/293 |

FOREIGN PATENT DOCUMENTS

| JP | 2000-120747 | 4/2000 |
| JP | 2008-039085 | 2/2008 |

(Continued)

OTHER PUBLICATIONS

Search Report dated May 27, 2021 issued in European Patent Application No. 20275176.4.

*Primary Examiner* — Robert A. Siconolfi
*Assistant Examiner* — San M Aung
(74) *Attorney, Agent, or Firm* — Cozen O'Connor

(57) ABSTRACT

Provided is a rotary damper having a first valve provided in a first oil passage, the rotary damper including an oil chamber filled with oil; a vane located in the oil chamber; a groove which is formed in the vane and functions as a valve box of the first valve; a valve body of the first valve which moves while being in contact with a bottom surface of the groove; and an elastic body which applies elasticity to the valve body, and causes the valve body to come into contact with a wall surface of the oil chamber when the oil does not flow, in which the bottom surface of the groove is a slope, and thereby the valve body which is in contact with the wall surface when receiving oil pressure from one direction moves away from the wall surface when receiving the oil pressure from an opposite direction.

7 Claims, 5 Drawing Sheets

(56) References Cited

FOREIGN PATENT DOCUMENTS

| JP | 2012211628 | A | * | 11/2012 | | |
|---|---|---|---|---|---|---|
| JP | 5-738656 | B2 | | 6/2015 | | |
| WO | WO-2018207511 | A | * | 11/2018 | ............. | A47K 13/12 |

* cited by examiner

ROTARY DAMPER

BACKGROUND

Technical Field

The present invention relates to a rotary damper having a valve provided in an oil passage.

Related Art

JP 2000-120747 A discloses a rotary damper having a valve provided in an oil passage. The rotary damper includes an oil chamber filled with oil, a vane located in the oil chamber, a groove which is formed in the vane and functions as the oil passage, a valve body of the valve which moves while being in contact with an end surface of the vane, and an elastic body which applies elasticity to the valve body and causes the valve body to come into contact with one surface of the vane when the oil does not flow. The valve body comes into contact with one surface of the vane when receiving the pressure of the oil from one direction, and moves away from the one surface of the vane when receiving the pressure of the oil from an opposite direction. This rotary damper improves the responsiveness of the valve by applying elasticity of the elastic body to the valve body. However, in this rotary damper, the groove formed in the vane functions as the oil passage, and the valve body closing the groove is configured to move away from the one surface of the vane by receiving the pressure of the oil from the opposite direction. The elastic body is deformed when the valve body moves away from the one surface of the vane, but the deformation of the elastic body is limited, and therefore the gap formed between the valve body and the one surface of the vane is narrow. Therefore, the flow rate of the oil passing through the groove is limited by the narrow gap. Therefore, this rotary damper cannot sufficiently reduce the resistance of the oil acting on the vane when the valve body receives the pressure of the oil from the opposite direction.

SUMMARY OF THE INVENTION

The invention has been made in view of the above circumstances, and an object of the invention is to improve the responsiveness of a valve and to sufficiently reduce the resistance of oil acting on a vane when a valve body receives the pressure of the oil from an opposite direction.

In order to achieve the object, an aspect of the invention provides a rotary damper having a first valve provided in a first oil passage, the rotary damper including an oil chamber filled with oil; a vane located in the oil chamber; a groove which is formed in the vane and functions as a valve box of the first valve; a valve body of the first valve which moves while being in contact with a bottom surface of the groove; and an elastic body which applies elasticity to the valve body, and causes the valve body to come into contact with a wall surface of the oil chamber when the oil does not flow, in which the bottom surface of the groove is a slope, and thereby the valve body which is in contact with the wall surface of the oil chamber when receiving pressure of the oil from one direction moves away from the wall surface of the oil chamber when receiving the pressure of the oil from an opposite direction.

With the rotary damper of the invention, since there is provided the elastic body which applies elasticity to the valve body and causes the valve body to come into contact with the wall surface of the oil chamber when the oil does not flow, the elasticity of the elastic body is always applied to the valve body. Therefore, it is possible to improve the responsiveness of the first valve. Further, since the groove formed in the vane functions as the valve box of the first valve and the valve body of the first valve moves while being in contact with the bottom surface of the groove that is a slope, there is no obstacles to reduce the flow rate of the oil passing through the first oil passage when the valve body receives the pressure of the oil from the opposite direction. Accordingly, it is possible to sufficiently reduce the resistance of the oil acting on the vane when the valve body receives the pressure of the oil from the opposite direction.

DETAILED DESCRIPTION OF THE EMBODIMENT

Figure 1:
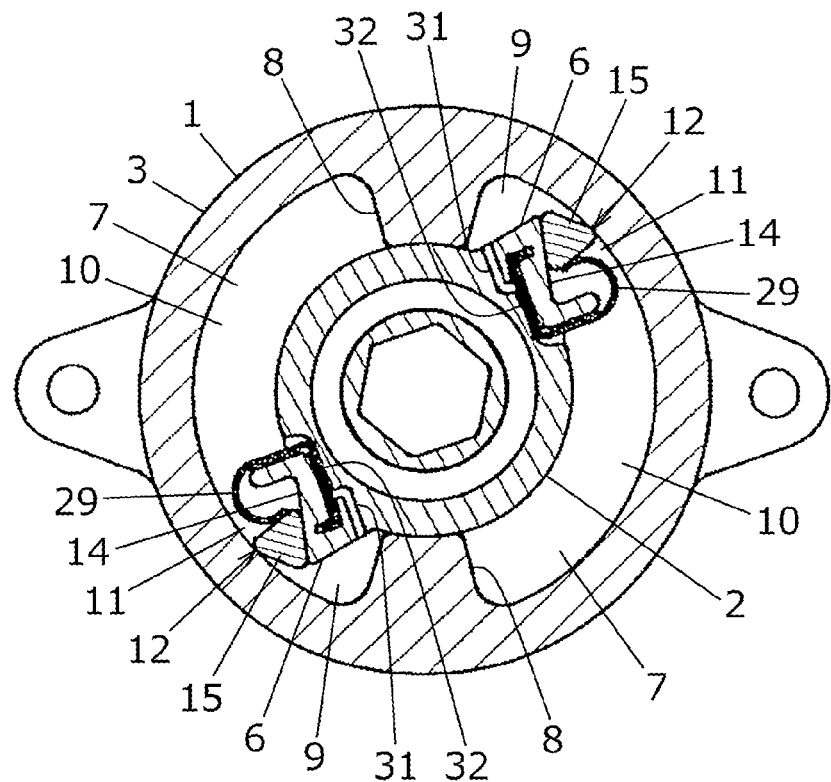
FIG. 1 is a cross-sectional view of a rotary damper according to an example.

Embodiments of the invention will be described below with reference to the examples illustrated in the drawings.

Example

First, a structure of a rotary damper according to an example will be described with reference to the drawings.

Figure 2:
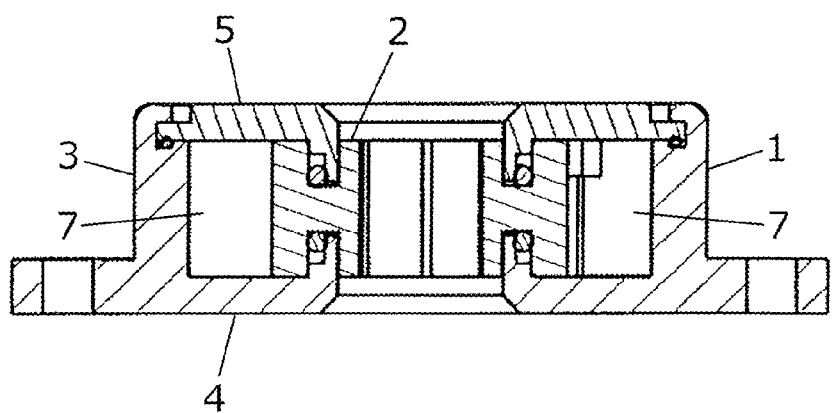
FIG. 2 is a longitudinal sectional view of the rotary damper according to the example.

The rotary damper according to the example includes a case 1 and a rotor 2 as illustrated in FIG. 1. The case 1 adopted in the example has a cylindrical peripheral wall 3. As illustrated in FIG. 2, one end of the peripheral wall 3 is closed by a bottom wall 4 integrally formed with the peripheral wall 3. As illustrated in FIG. 2, the other end of the peripheral wall 3 is closed by a lid 5. The rotor 2 adopted in the example is housed in the case 1 and supported by the case 1 and the lid 5, as illustrated in FIGS. 1 and 2. The rotor 2 has vanes 6, as illustrated in FIG. 3.

The rotary damper according to the example includes an oil chamber 7 as illustrated in FIGS. 1 and 2. The oil chamber 7 adopted in the example is partitioned by partition walls 8 integrally formed with the peripheral wall 3 and the bottom wall 4 as illustrated in FIG. 1. The oil chamber 7 is filled with oil. As illustrated in FIG. 1, the vanes 6 are located in the oil chamber 7. As illustrated in FIG. 1, the oil chamber 7 is divided into two adjacent chambers (hereinafter, referred to as a first chamber 9 and a second chamber 10) with the vane 6 interposed therebetween.

Figure 7:
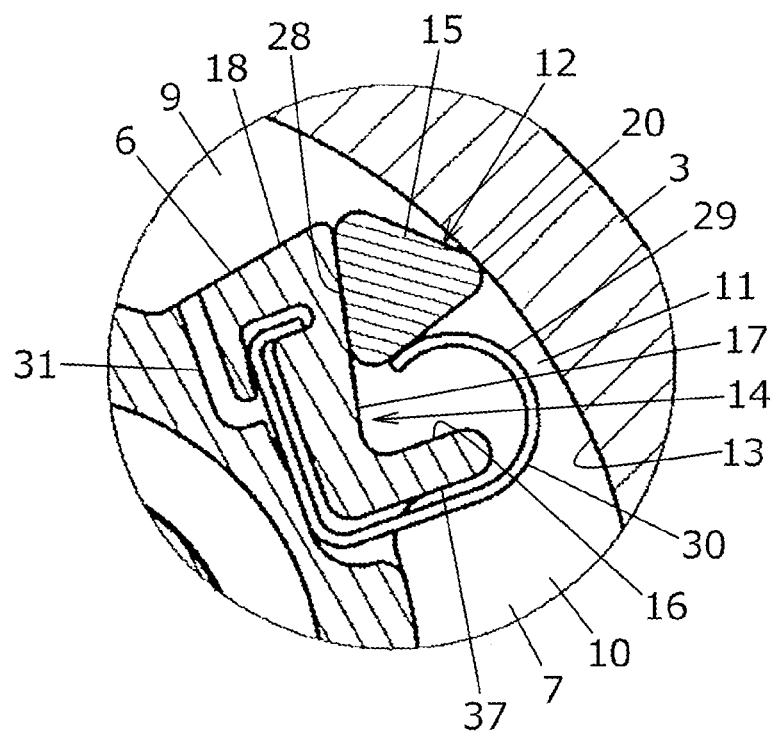
FIG. 7 is a diagram for describing a configuration and an operation of a first valve adopted in the example.
Figure 8:
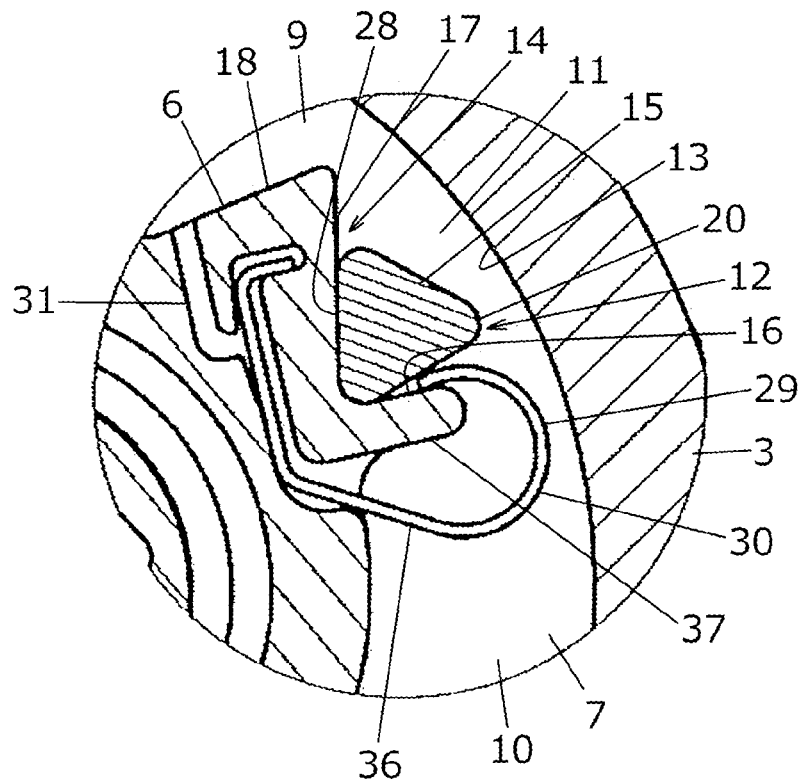
FIG. 8 is a diagram for describing the configuration and the operation of the first valve adopted in the example.

As illustrated in FIG. 1, the rotary damper according to the example includes a first valve 12 provided in a first oil passage 11. As illustrated in FIGS. 1 and 8, the first oil passage 11 adopted in the example is an oil passage formed between the vane 6 and a wall surface 13 of the oil chamber 7 (that is, an inner peripheral surface of the peripheral wall 3). As illustrated in FIGS. 1, 7, and 8, the first valve 12 adopted in the example is configured to have a groove 14 functioning as a valve box of the first valve 12, and a valve body 15.

Figure 3:
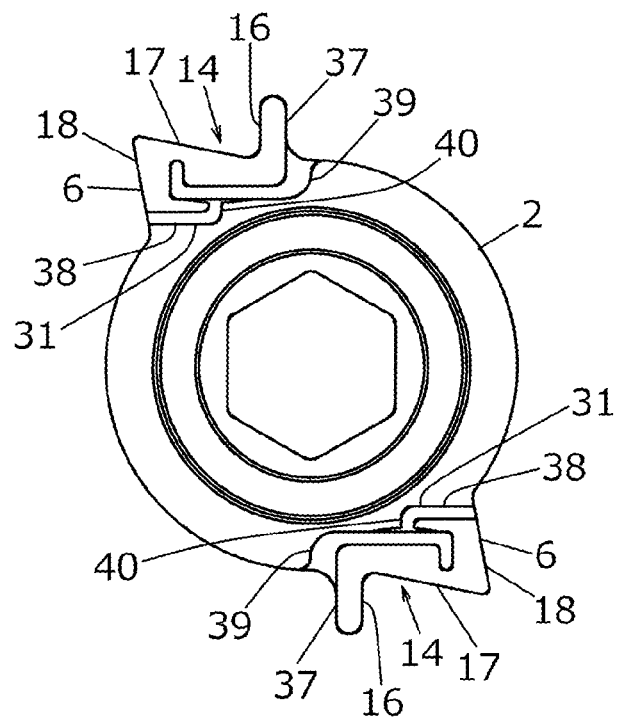
FIG. 3 is a plan view of a rotor adopted in the example.

As illustrated in FIGS. 1 and 3, the groove 14 adopted in the example is formed in the vane 6. The groove 14 has an L-shaped cross section, as illustrated in FIGS. 1, 7, and 8. As illustrated in FIG. 8, a side surface 16 of the groove 14 has a function of preventing the valve body 15 from falling off. As illustrated in FIG. 3, a bottom surface 17 of the groove 14 is a slope. More specifically, as illustrated in FIGS. 7 and 8, the bottom surface 17 of the groove 14 is a surface inclined in a manner that a gap between one end of the bottom surface 17 (that is, a portion where one surface 18 of the vane 6 and the bottom surface 17 of the groove 14 intersect) and the wall surface 13 of the oil chamber 7 is the narrowest and a gap between the other end of the bottom surface 17 (that is, a portion where the side surface 16 of the groove 14 and the bottom surface 17 of the groove 14 intersect) and the wall surface 13 of the oil chamber 7 is the widest.

As illustrated in FIGS. 7 and 8, the valve body 15 adopted in the example has a shape that allows the valve body 15 to move while being in contact with the bottom surface 17 of the groove 14. The valve body 15 preferably has a triangular prism shape. With the triangular prism-shaped valve body 15, since the oil flows along the wall surface 13 of the oil chamber 7 when the oil passes through the first oil passage 11, the movement of the valve body 15 is stable, and the valve body 15 can be favorably controlled. Further, with the triangular prism-shaped valve body 15, since the valve body 15 does not rotate, a groove functioning as an orifice, a first slit for deforming a first bottom surface of the valve body 15, and a second slit for deforming a second bottom surface of the valve body 15 can be formed in the valve body 15. Instead of the groove, an orifice having small holes may be formed in the valve body 15.

Figure 4:
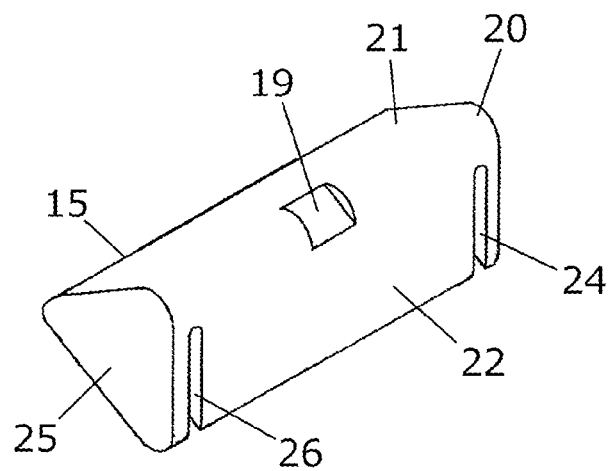
FIG. 4 is a perspective view of a valve body adopted in the example.

As illustrated in FIG. 4, the valve body 15 adopted in the example has a groove 19 functioning as an orifice. The groove 19 is formed in a corner of the valve body 15 (hereinafter, referred to as a first corner 20) that comes into contact with the wall surface 13 of the oil chamber 7 when the valve body 15 receives the pressure of the oil from one direction (a counterclockwise direction in FIG. 1). The first corner 20 is a corner where two side surfaces (that is, a first side surface 21 and a second side surface 22) of the valve body 15 intersect.

Figure 5:
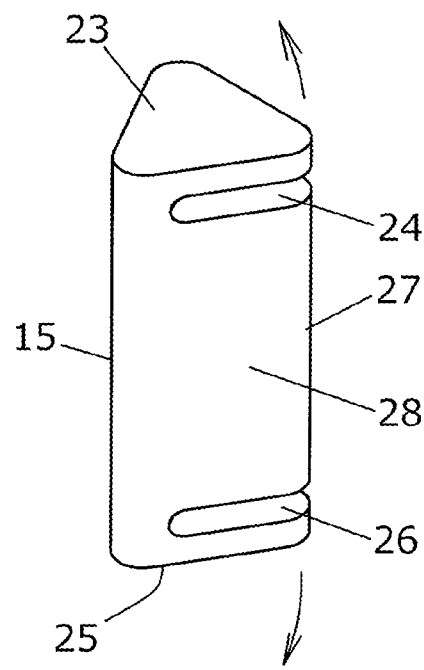
FIG. 5 is a perspective view of the valve body adopted in the example.

As illustrated in FIGS. 4 and 5, the valve body 15 adopted in the example has a first slit 24 for deforming a first bottom surface 23 of the valve body 15, and a second slit 26 for deforming a second bottom surface 25 of the valve body 15. The first slit 24 and the second slit 26 are formed in a corner (hereinafter, referred to as a second corner 27) which does not come into contact with the wall surface 13 of the oil chamber 7 and receives the pressure of the oil from the one direction (the counterclockwise direction in FIG. 1). The second corner 27 is a corner where two side surfaces (that is, the second side surface 22 and a third side surface 28) of the valve body 15 intersect.

Figure 6:
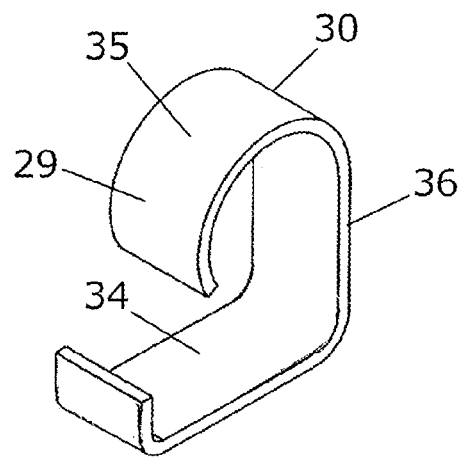
FIG. 6 is a perspective view of an elastic body adopted in the example.

The rotary damper according to the example includes an elastic body 29, as illustrated in FIG. 1. As illustrated in FIG. 6, the elastic body 29 adopted in the example is a spring having a portion (hereinafter, referred to as a first portion 30) that applies elasticity to the valve body 15 of the first valve 12 and a portion (hereinafter, referred to as a second portion 34) that is deformed toward a valve seat 33 of a second valve 32 by receiving the pressure of the oil in a second oil passage 31.

As illustrated in FIG. 6, the first portion 30 is composed of a portion 35 having an arcuate cross section and a flat portion 36 extending from the portion 35, and always applies elasticity (restoring force) to the valve body 15. Therefore, when the oil does not flow, the valve body 15 (that is, the first corner 20) is in contact with the wall surface 13 of the oil chamber 7 due to the elasticity of the first portion 30. The first portion 30 is a part of the elastic body 29 which is deformed by the pressure of the oil being applied through the valve body 15, that is, as illustrated in FIG. 8, the flat portion 36 is bent to store elastic energy, and returns the valve body 15 to the original position by releasing the energy. As illustrated in FIG. 6, the second portion 34 is a flat portion that intersects with the flat portion 36 of the first portion 30, and is a part of the elastic body 29.

As illustrated in FIG. 1, the rotary damper according to the example includes the second valve 32 provided in the second oil passage 31. As illustrated in FIGS. 7 and 8, the second oil passage 31 adopted in the example is an oil passage for circulating oil between the one surface 18 side of the vane 6 (that is, the first chamber 9) and the other surface 37 side of the vane 6 (that is, the second chamber 10). As illustrated in FIG. 3, the second oil passage 31 is formed in the rotor 2, and is configured to have a first groove 38 which is open on the one surface 18 side of the vane 6 and extends from the opening to the other surface 37 side of the vane 6, a second groove 39 which is open on the other surface 37 side of the vane 6 and extends from the opening to the one surface 18 side of the vane 6, and a third groove 40 that connects the first groove 38 and the second groove 39.

Figure 9:
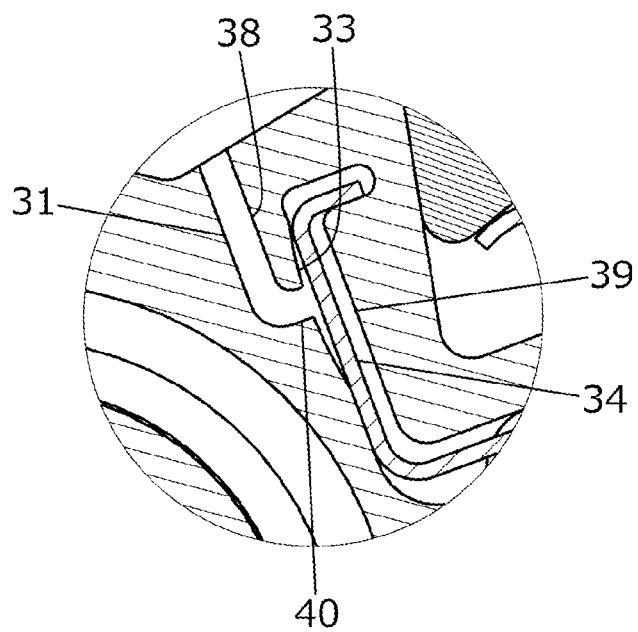
FIG. 9 is a diagram for describing a configuration and an operation of a second valve adopted in the example.
Figure 10:
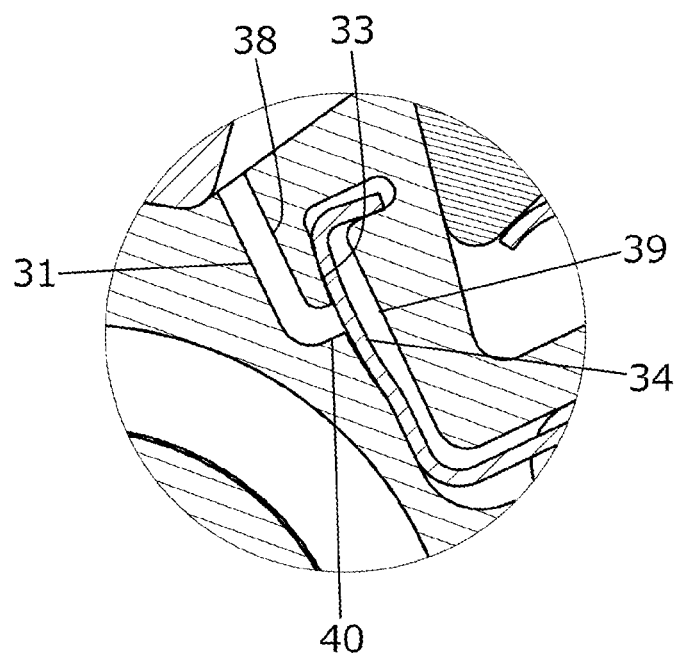
FIG. 10 is a diagram for describing the configuration and the operation of the second valve adopted in the example.

The second valve 32 adopted in the example has a function of changing the flow rate of the oil passing through the second oil passage 31 according to the pressure of the oil. As illustrated in FIGS. 9 and 10, the second valve 32 causes the second portion 34 of the elastic body 29, which is inserted into the second groove 39, to function as a valve body, and causes a recess formed in a connection portion of the second groove 39 and the third groove 40 to function as the valve seat 33.

Next, the operation of the first valve 12 will be described.

Before the rotation of the rotor 2 is started, that is, when the oil does not flow, the elasticity of the first portion 30 of the elastic body 29 is applied to the valve body 15, which causes the valve body 15 to be in a state in which the third side surface 28 is in contact with the bottom surface 17 of the groove 14 and the first corner 20 is in contact with the wall surface 13 of the oil chamber 7, as illustrated in FIG. 7.

When the rotor 2 rotates in a forward direction, the valve body 15 receives the pressure of the oil from the one direction (the counterclockwise direction in FIG. 1). As illustrated in FIG. 7, at this time, since the third side surface 28 of the valve body 15 is in contact with the bottom surface 17 of the groove 14 and the first corner 20 of the valve body 15 is in contact with the wall surface 13 of the oil chamber 7, most of the first oil passage 11 is closed by the valve body 15. Therefore, the oil flows through an orifice formed by the groove 19 formed in the first corner 20 of the valve body 15 and the wall surface 13 of the oil chamber 7. Thereby, the pressure of the oil in the second chamber 10 is increased and the resistance of the oil acting on the vane 6 is increased, so that the rotation speed of the rotor 2 is reduced.

In general, in a case where the operating temperature is high (70 to 90° C.), since the viscosity of the oil is decreased, the resistance of the oil acting on the vane 6 is decreased. Further, in a case where the operating temperature is low (−40 to −20° C.), since the viscosity of the oil is increased, the resistance of the oil acting on the vane 6 is increased. However, the valve body 15 adopted in the example is made of resin, and in a case where the operating temperature is high (70 to 90° C.), the valve body 15 expands and softens. At this time, when the pressure of the oil is applied to the first slit 24 and the second slit 26 of the valve body 15, the first bottom surface 23 of the valve body 15 is deformed upward (that is, toward the lid 5) in a bow shape, and the second bottom surface 25 of the valve body 15 is deformed downward (that is, toward the bottom wall 4) in a bow shape, as illustrated in FIG. 5. Thereby, the gap between the lid 5 and the valve body 15 and the gap between the bottom wall 4 and the valve body 15 are narrowed. Therefore, with the valve body 15 adopted in the example, the resistance of the oil acting on the vane 6 is not decreased even if the viscosity of the oil is decreased. On the other hand, in a case where the operating temperature is low (−40 to −20° C.), the valve body 15 contracts and hardens. At this time, even when the pressure of the oil is applied to the first slit 24 and the second slit 26 of the valve body 15, the first bottom surface 23 and the second bottom surface 25 of the valve body 15 are not deformed, and thus the gap between the lid 5 and the valve body 15 and the gap between the bottom wall 4 and the valve body 15 are widened. Therefore, with the valve body 15 adopted in the example, the resistance of the oil acting on the vane 6 is not increased even if the viscosity of the oil is increased. As a result, with the rotary damper according to the example, even in a case where the rotary damper is used at a high temperature (70 to 90° C.) or low temperature (−40 to −20° C.), it is possible to obtain substantially the same characteristics as a case where the rotary damper is used at room temperature (15 to 25° C.).

When the rotor 2 rotates in a reverse direction, the valve body 15 receives the pressure of the oil from the opposite direction (a clockwise direction in FIG. 1). As illustrated in FIG. 8, the first portion 30 of the elastic body 29 is deformed by receiving the pressure of the oil via the valve body 15, and the valve body 15 moves toward the side surface 16 of the groove 14 while keeping the third side surface 28 in contact with the bottom surface 17 of the groove 14. Since the bottom surface 17 of the groove 14 is a slope, when the valve body 15 moves while being in contact with the bottom surface 17 of the groove 14, the first corner 20 of the valve body 15 moves away from the wall surface 13 of the oil chamber 7, and the opening area of the first oil passage 11 can be increased. Further, since the valve body 15 has a triangular prism shape, the first side surface 21 of the valve body 15 can guide the oil such that the oil flows along the wall surface 13 of the oil chamber 7. Thereby, the oil flows through the first oil passage 11 in which there is no obstacles to reduce the flow rate of the oil, so that it is possible to reduce the pressure difference between the oil in the first chamber 9 and the oil in the second chamber 10. As a result, with the rotary damper according to the example, it is possible to sufficiently reduce the resistance of the oil acting on the vane 6 when the valve body 15 receives the pressure of the oil from the opposite direction.

When the rotor 2 rotates in the forward direction immediately after the rotor 2 rotates in the reverse direction, due to the elasticity of the first portion 30 of the elastic body 29, the valve body 15 immediately moves toward one end of the groove 14 while keeping the third side surface 28 in contact with the bottom surface 17 of the groove 14, and the first corner 20 of the valve body 15 comes into contact with the wall surface 13 of the oil chamber 7. Therefore, the responsiveness of the first valve 12 is very good.

Next, the operation of the second valve 32 will be described.

When the rotor 2 rotates forward, the oil in the second chamber 10 enters the second groove 39 of the second oil passage 31. At this time, in a case where the rotational force of the rotor 2 (that is, the force to rotate the rotor) is small, since the pressure of the oil in the second groove 39 is low as compared with a case where the rotational force of the rotor 2 is large, the second portion 34 of the elastic body 29 functioning as the valve body of the second valve 32 is hardly deformed even in a case of receiving the pressure of the oil (that is, low pressure), as illustrated in FIG. 9. Since the second portion 34 of the elastic body 29 has elasticity, the degree of deformation is changed according to the magnitude of the external force. In this case, since the valve seat 33 of the second valve 32 (that is, the recess formed in the connection portion of the second groove 39 and the third groove 40) is open, the oil flows into the first chamber 9 through the third groove 40 and the first groove 38 without the flow rate being limited. On the other hand, in a case where the rotational force of the rotor 2 is large, since the pressure of the oil in the second groove 39 is high as compared with a case where the rotational force of the rotor 2 is small, the second portion 34 of the elastic body 29 receives the pressure of the oil (that is, high pressure) to be largely deformed toward the valve seat 33 of the second valve 32 so as to close the valve seat 33 of the second valve 32, as illustrated in FIG. 10. Therefore, the flow rate of the oil flowing into the first chamber 9 through the third groove 40 and the first groove 38 is limited. In the case of the first valve 12, the flow rate of the oil, which is limited by the first valve 12, is constant even when the rotational force of the rotor 2 is changed, but in the case of the second valve 32, unlike the first valve 12, the flow rate of the oil, which is limited by the second valve 32, is changed according to the change of the rotational force of the rotor 2. As a result, with the rotary damper according to the example, it is possible to maintain the rotation speed of the rotor 2 substantially constant even when the rotational force of the rotor 2 is changed.

REFERENCE SIGNS LIST 1 case
2 rotor
3 peripheral wall constituting case
4 bottom wall constituting case
5 lid
6 vane
7 oil chamber
8 partition wall
9 first chamber
10 second chamber
11 first oil passage
12 first valve
13 wall surface of oil chamber
14 groove formed in vane
15 valve body
16 side surface of groove
17 bottom surface of groove
18 one surface of vane 19 groove formed in valve body
20 first corner of valve body
21 first side surface of valve body
22 second side surface of valve body
23 first bottom surface of valve body
24 first slit
25 second bottom surface of valve body
26 second slit
27 second corner of valve body
28 third side surface of valve body
29 elastic body
30 first portion of elastic body
31 second oil passage
32 second valve
33 valve seat
34 second portion of elastic body
35 portion constituting first portion of elastic body and having arcuate cross section
36 flat portion constituting first portion of elastic body
37 the other surface of vane
38 first groove formed in rotor
39 second groove formed in rotor
40 third groove formed in rotor

What is claimed is:

1. A rotary damper having a first valve provided in a first oil passage, the rotary damper comprising:
    an oil chamber formed in a case and filled with oil;
    a vane located in the oil chamber;
    a groove which is formed in the vane and functions as a valve box of the first valve;
    a valve body of the first valve which moves while being in contact with a bottom surface of the groove; and
    an elastic body which applies elasticity to the valve body, and causes the valve body to come into contact with a peripheral wall of the case when the oil does not flow,
    wherein the bottom surface of the groove is a slope,
    wherein when the valve body which is away from the peripheral wall of the case receives pressure of the oil from one direction, the valve body moves up the slope by the elasticity of the elastic body and contacts the peripheral wall of the case, and
    wherein when the valve body which is contact with the peripheral wall of the case receives pressure of the oil from a direction opposite the one direction, the valve body moves away from the peripheral wall of the case by going down the slope, and the elastic body becomes deformed by receiving the pressure of the oil via the valve body at the same time.

2. The rotary damper according to claim 1, wherein the valve body has a triangular prism shape.

3. The rotary damper according to claim 1, wherein the valve body has a triangular prism shape,
    the valve body includes a groove functioning as an orifice, and
    the groove functioning as the orifice is formed in a corner where two side surfaces of the valve body intersect and which comes into contact with the wall surface of the oil chamber.

4. The rotary damper according to claim 1, wherein
    the valve body has a triangular prism shape,
    the valve body includes a first slit for deforming a first bottom surface of the valve body, and
    the first slit is formed in a corner where two side surfaces of the valve body intersect and which receives the pressure of the oil from the one direction without coming into contact with the wall surface of the oil chamber.

5. The rotary damper according to claim 1, wherein the oil chamber is divided into a first chamber and a second chamber by the vane;
    wherein the rotary damper further comprises a second oil passage which circulates the oil between the first chamber and the second chamber; and a second valve which is provided in the second oil passage reduces the amount of the oil passing through the second oil passage according to the pressure of the oil; and
    wherein the elastic body functions as a valve body of the second valve.

6. The rotary damper according to claim 5, wherein the elastic body is a spring having a portion that applies elasticity to the valve body of the first valve and a portion that is deformed toward a valve seat of the second valve by receiving the pressure of the oil in the second oil passage.

7. The rotary damper according to claim 4, wherein
    the valve body further includes a second slit for deforming a second bottom surface of the valve body locating in the opposite of the first bottom surface of the valve body, and
    the second slit is formed in a corner where two side surfaces of the valve body intersect and which receives the pressure of the oil from the one direction without coming into contact with the wall surface of the oil chamber.

* * * * *